Feb. 7, 1939.  E. F. MARTINET  2,146,152
SUCTION CLEANER CONSTRUCTION
Filed May 7, 1935    2 Sheets-Sheet 1
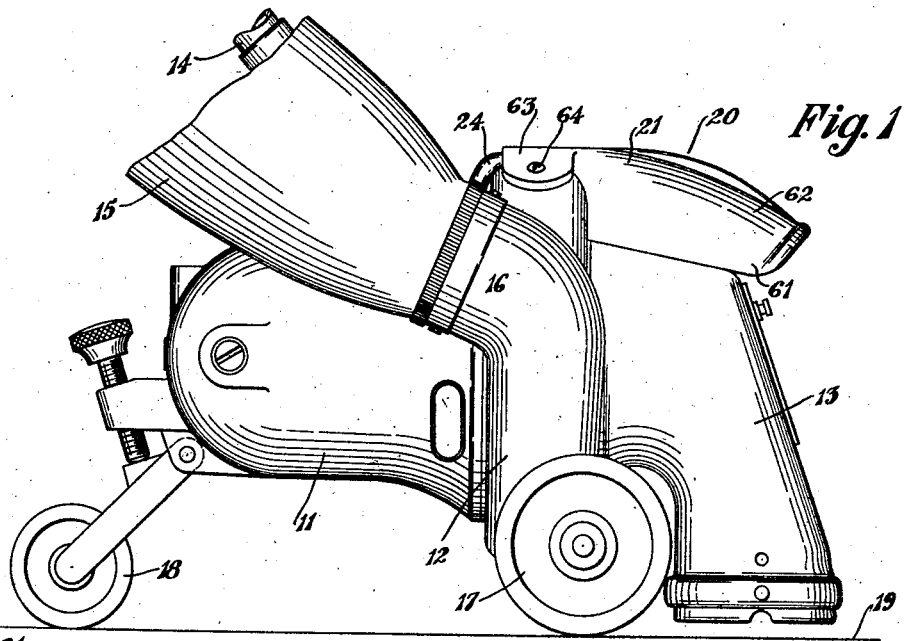
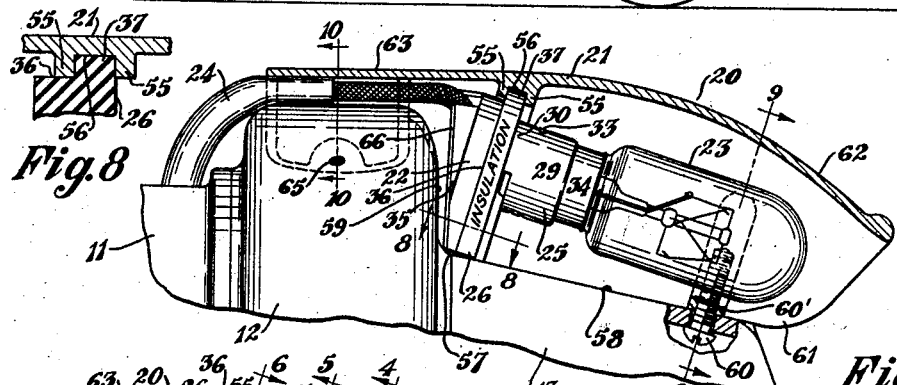
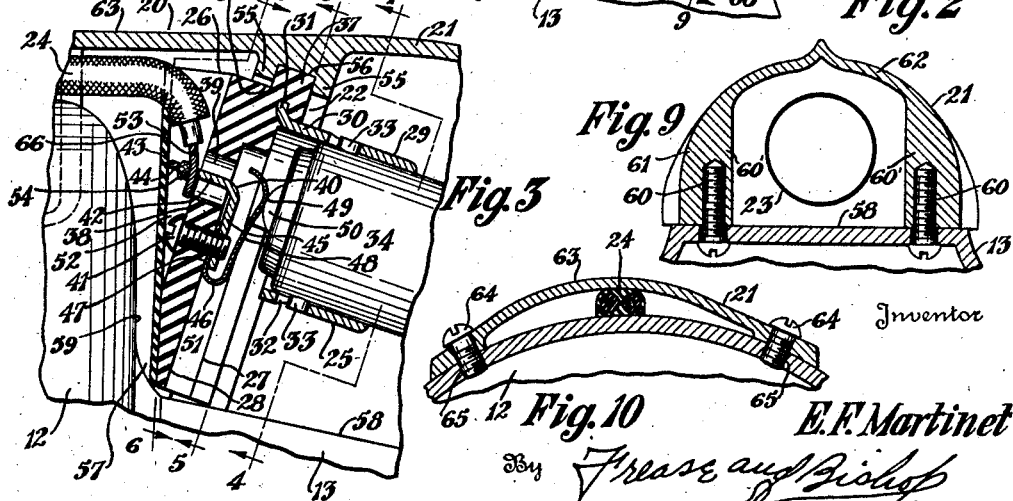
Inventor
E. F. Martinet
By Frease and Bishop
Attorneys Feb. 7, 1939.  E. F. MARTINET  2,146,152
SUCTION CLEANER CONSTRUCTION
Filed May 7, 1935  2 Sheets-Sheet 2

Inventor
E. F. Martinet
By Frease and Bishop
Attorneys

Patented Feb. 7, 1939

2,146,152

UNITED STATES PATENT OFFICE 2,146,152

SUCTION CLEANER CONSTRUCTION

Eugene F. Martinet, Cleveland, Ohio, assignor to The P. A. Geier Company, Cleveland, Ohio, a corporation of Ohio Application May 7, 1935, Serial No. 20,183

4 Claims. (Cl. 240—2)

The invention relates to suction cleaners, and more particularly to an electric lighting device or headlight construction for an electrically operated portable, domestic or household suction cleaner having a motor driven fan, a suction nozzle and a dust bag manipulated by a handle.

A suction cleaner is equipped with a lighting device for illuminating floor areas, dark corners and places beneath articles of furniture, in order that the cleaner nozzle may be more readily, quickly and easily manipulated for cleaning areas otherwise poorly illuminated.

The provision of an electric lighting device on a suction cleaner, however, adds to the cleaner an electrical device and electrical connections therefor, which may be hazardous if any of the connections become loosened, or if the circuit for the lighting device becomes short circuited.

Moreover, difficulties are encountered in equipping an electrically-operated portable suction cleaner with an electric lighting device, because such a device is subjected to jars and constant vibration during operation of the cleaner, with a resultant tendency of loosening the lighting device and the electrical connections and light sockets thereof.

Moreover, all of these difficulties are increased because only a very limited amount of space is available for mounting a lighting device on a suction cleaner at a place where most efficient nozzle illumination may be provided.

Accordingly, it is an object of the present invention to provide an electrically-operated portable suction cleaner with a lighting device in which hazards resulting from loose electrical connections or short circuiting are eliminated.

Likewise, it is an object of the present invention to provide an electrically-operated portable suction cleaner with a lighting device, the constituent parts of which are unaffected by vibration and jarring.

It is a further object of the present invention to provide an electrically-operated portable suction cleaner with a lighting device that may be readily attached to the cleaner in a limited space, usually available in various types of portable suction cleaners.

Furthermore, it is an object of the present invention to provide a lighting device attachment for a suction cleaner having relatively few parts of simple and inexpensive construction in manufacture, assembly and use.

And finally, it is an object of the present invention to provide a lighting device for an electrically-operated portable suction cleaner, which avoids the described difficulties experienced in the use of prior cleaner lighting devices, and which incorporates one or more of the advantageous characteristics set forth above.

These and other objects may be obtained by the suction cleaner and lighting device constructions, parts, elements and combinations, preferred embodiments of which are shown in the accompanying drawings and are hereinafter described in detail and claimed, which may be stated in general terms as preferably including in suction cleaner lighting device construction, an insulating base provided with an integral socket, a light bulb removably mounted in the socket, electrical connectors extending from the base in electric circuit connection with the light bulb, and a reflector housing guard clamping said base and connectors to the suction cleaner casing.

In the drawings,

Figure 1 is a side elevation of a portion of an electrically-operated portable suction cleaner equipped with one form of improved lighting device or headlight construction;

Fig. 2 is an enlarged longitudinal sectional elevation of the improved lighting device shown in Fig. 1, attached to a fragmentary portion of a suction cleaner;

Fig. 3 is a still further enlarged fragmentary sectional view of some of the parts shown in Fig. 2, taken on the line 3—3, Fig. 4;

Fig. 8 is a fragmentary sectional view taken on the line 8—8, Fig. 2;

Fig. 9 is a section taken on the line 9—9, Fig. 2;

Fig. 10 is a section taken on the line 10—10, Fig. 2;

Similar numerals refer to similar parts throughout the various figures of the drawings.

Figure 4:
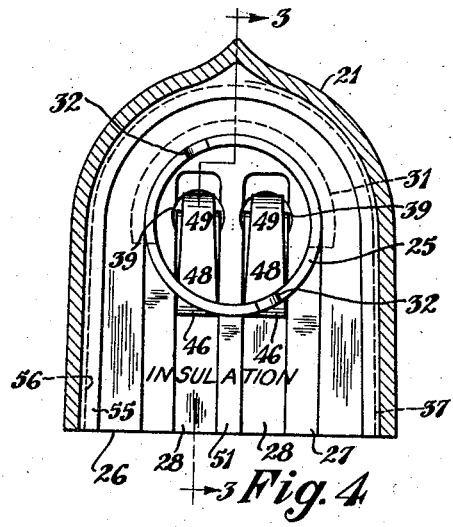
Fig. 4 is a cross section through the improved lighting device with the light bulb removed, taken on the line 4—4, Fig. 3.

A usual type of electrically-operated portable suction cleaner is shown in Fig. 1, which may comprise a motor in a motor housing 11, provided with a fan housing 12 having a fan (not shown) therein, and a suction nozzle 13 communicating with the fan housing. An operating handle 14, and a dust bag 15 connected with the exhaust opening 16 of the fan housing 12, are also provided for the cleaner; and the motor housing 11, the fan housing 12 and nozzle 13 are mounted on front casters 17 and a preferably adjustable rear caster 18 for ambulant motion over a floor or the like indicated at 19.

One embodiment of the improved electric lighting device is indicated generally at 20 in Fig. 1 and is best illustrated in Figs. 2 to 10, inclusive. The lighting device 20 preferably includes a casing or housing 21 in which is mounted a socket base generally indicated at 22 (Fig. 7), a light bulb 23, and electrical connectors 24.

The socket base 22 preferably comprises a socket member 25 and a base member 26; and the base member 26 is generally U-shaped in contour and is formed of insulation material such as molded Bakelite, or the like. The socket side of the base member 26 is preferably provided with a recess 27, and preferably two slots or grooves 28 are formed in the recess 27.

The socket member 25 preferably comprises a cylindrical portion 29 from which a semi-circular portion 30 extends; and the semi-circular portion 30 terminates in an outturned semi-circular annular flange 31, which is integrally secured to the insulation material base member 26 as by placing the socket member 25 in the mold in which the insulation material base member 26 is molded.

The cylindrical portion 29 of the socket member 25 is preferably provided with the usual diametrically opposed L-slots 32 for receiving and retaining the usual pins 33 projecting from the socket sleeve 34 of the electric light bulb 23.

The connector side of the base member 26 is preferably wedge-shaped as indicated generally at 35, with a generally U-shaped contour smaller than that of the base member 26 itself, thereby forming an angled corner 36 throughout the periphery of the U; and the corner 36 thus forms a peripheral flange 37 on the base member 26 for a purpose which will be hereinafter described.

Two irregularly shaped recesses 38 are preferably provided in the connector side of the base member 26; and apertures 39 are formed in the base member 26 communicating between the recesses 38 and the upper ends of the slots 28.

Two L-shaped clips 40 are secured to the base member 26 by screws 41. With respect to each clip 40, one leg 42 thereof extends through one of the apertures 39 with its outer end 43 perforated at 44 and located within the confines of one of the recesses 38; and the other leg 45 thereof is located within the confines of one of the slots 28 where it is engaged by the screw 41.

A spring contact clip 46, generally U-shaped, with a short leg 47 and a long leg 48, is assembled to each clip 40 by clamping its short leg 47 by the screw 41 between the leg 45 of the L-shaped clip 40 and the bottom surface of the recess 28, so that the long leg 48 thereof resiliently contacts at 49 with a contact point 50 on the light bulb 23.

Figure 5:
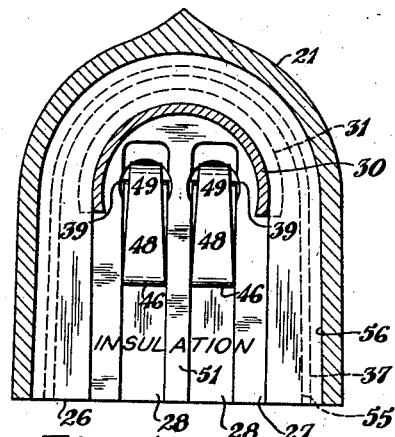
Fig. 5 is a sectional view similar to Fig. 4, but taken on the line 5—5, Fig. 3.
Figure 6:
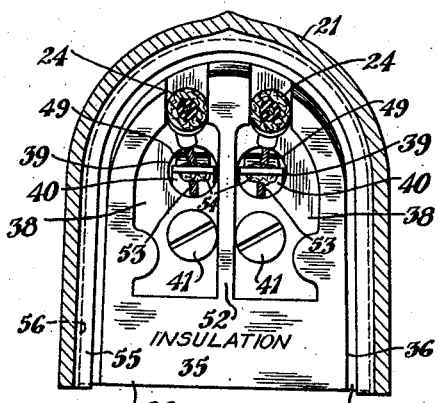
Fig. 6 is another cross sectional view of the lighting device taken on the line 6—6, Fig. 3.
Figure 7:
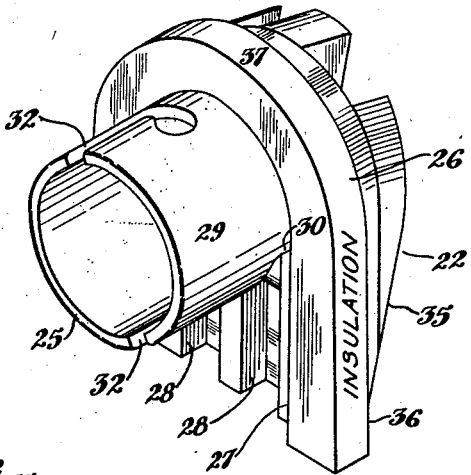
Fig. 7 is a perspective view of the integral base and socket used in the improved lighting device.

Referring to Figs. 3, 4 and 5, the rib 51 of the insulation material base member 26 extends between and separates the two grooves 28 and the contact clips 46 and the assemblies thereof in the grooves 28; and likewise, referring to Figs. 3 and 6, the rib 52 of the insulation material base member 26 extends between the recesses 38 in the connector side of the base and separates the ends 43 of the L-shaped clips 40. The terminal ends 53 of the electric wire connectors 24 may be soldered at 54 within the holes 44 provided in the ends 43 of the clips 40; and the connectors 24 may lead, as shown in Fig. 2, into the motor housing 11 where they may be connected to the source of power by which the cleaner motor is operated.

The casing or housing 21 is preferably provided internally with two inwardly projecting U-shaped ribs 55 forming a U-shaped groove 56 therebetween (Figs. 3 and 5) in which the flange 37 of the base member 26 is received. Referring to Figs. 1 and 2, an angular corner shoulder or recess 57 is present between the upper surface 58 of the nozzle 13 and the outer face 59 of the fan casing 12; and the corner 57 provides a convenient and accessible but restricted space within which to locate and mount the lighting device 20.

The casing 21 is preferably secured to the nozzle 13 by screws 60 (Figs. 2 and 9) engaging the ribs 60' in the outer portions of the side walls 61 of the trough reflector and guard portion 62 of the casing or housing 21; and the crescent-shaped end 63 (Figs. 1 and 10) of the casing 21 is secured to the fan casing 12 preferably by screws 64 received in threaded apertures 65 in the fan casing.

Referring to Fig. 10, when the crescent-shaped portion 63 is attached to the fan casing 12, the electrical connectors or wires 24 are compressed and clamped between the portion 63 and the fan casing 12. This not only secures the wires 24 against vibration, but the insulation covering on the wires forms a cushion between the lighting device casing 21 and the fan casing 12 to prevent vibration and jars from loosening the casing 21 from the cleaner.

Referring to Figs. 2 and 3, when the casing 21 is secured to the cleaner the flange 37 of the insulation base 26 is located in the casing groove 56, whereby the socket base 22 is clamped between the casing 21 and the upper nozzle wall 58, and between the casing 21 and the upper fan housing wall 59.

As indicated in Figs. 2 and 3, at 66, a pad of insulating material is preferably interposed between the socket base 22 and the fan housing wall 59 for separating the clip ends 43 from the metal housing walls.

As usually constructed, the suction cleaner fan casing and nozzle have metal walls; and the light casing 21 is preferably formed of cast metal. Likewise, the socket member 25 of the socket base 22 is preferably made of metal, as are the electrical connectors 24 and the clips 40 and 46.

By forming the base member 26 of insulation material and integrally securing the socket member 25 thereto when molding the base member 26, the socket member 25 does not contact with any other metallic part and is insulated from all other parts of the cleaner. For this reason, if one of the spring clips 59 becomes loosened and contacts with the socket member 25, no damage or short circuiting can occur.

The spring clips 46 hold the light bulb in the socket member 25 in a usual manner and the tension thereon in turn holds the screws 41 from loosening due to vibration, so that the lighting device is substantially vibration proof.

By clamping the socket base 22 between the housing 21 and cleaner casing without the use of any screws engaging the base member 26, the same is held tight without the possibility of cracking the brittle molded insulation material from which the member 26 is formed.

The provision of the ribs 51 and 52 projecting between electrical connections and contacts adequately insulates the lighting device so that no damage can occur, even though some of the electrical connections may accidentally become loosened.

Referring to Fig. 2, the lighting device 20 projects forwardly beyond the nozzle so that a maximum amount of light from the light bulb 23 shines on the floor being cleaned.

Accordingly, the improved construction provides a lighting device for a suction cleaner which is very simplified in design, easy to assemble; and enables a lighting device to be secured to the cleaner in a relatively small and cramped space with a satisfactory socket which is nevertheless well insulated from the cleaner.

Figure 11:
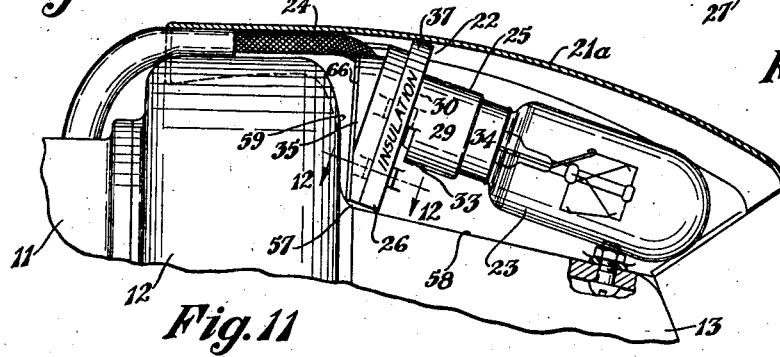
Fig. 11 is a view similar to Fig. 2, showing a modified form of improved lighting device or headlight construction.
Figure 12:
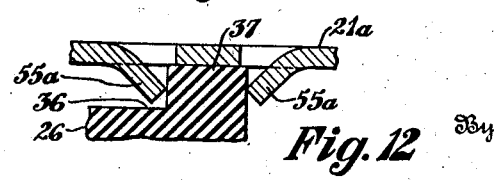
Fig. 12 is a fragmentary section taken on the line 12—12, Fig. 11.

In Figs. 11 and 12, a construction is shown identical to that shown in the remaining figures of the drawings, excepting only that its casing 21a is formed from stamped metal rather than cast metal. Otherwise, the construction of the remaining parts of the lighting device shown in Figs. 11 and 12 is the same; and the casing 21a functions in every manner in the same way as the casing or housing 21. For securing the socket base 22 to the casing 21a, spaced tangs 55a are struck inward from the housing 21a to function in the same manner as the ribs 55 provided in the casing 21, to engirdle the flange 37 of the socket base 22.

I claim:—

1. In electric suction cleaner construction having a casing including a fan housing and nozzle with a corner formed therebetween, an electric lighting device including an insulating socket base, a light bulb removably mounted thereon, electrical connectors extending from the base in electric circuit connection with the light bulb, and a housing bearing against one edge of said base and clamping the opposite edge of the base in said corner.

2. In electric suction cleaner construction including a fan casing having a wall and a nozzle having a wall forming a corner therewith, an electric lighting device including a housing mounted on one of said walls at said corner, and a light socket clamped in the corner by the housing between the housing and said last mentioned wall and insulated therefrom.

3. In electric suction cleaner construction including a casing, an electric lighting device mounted on said casing including a base formed of molded insulation material provided with a socket, there being a flange provided on said base, a light bulb in said socket, a housing secured to said casing provided with a groove, and said flange being located in said groove for securing the base to the casing.

4. In electric suction cleaner construction including a casing, an electric lighting device mounted on said casing including a base formed of molded insulation material provided with a socket, there being a flange provided on said base, a light bulb in said socket, a housing secured to said casing provided with inwardly projecting means, and said flange being located in said means for securing the base to the casing.

EUGENE F. MARTINET.